United States Patent [19]
Nakane et al.

[11] Patent Number: 5,572,494
[45] Date of Patent: Nov. 5, 1996

[54] DEVICE FOR DETECTING TRAVELING SPEED OF PICKUP

[75] Inventors: Hiroshi Nakane; Taiji Inomata, both of Yokohama, Japan

[73] Assignee: Kabushiki Kaisha Toshiba, Kawasaki, Japan

[21] Appl. No.: 510,638

[22] Filed: Aug. 3, 1995

Related U.S. Application Data

[63] Continuation of Ser. No. 330,096, Oct. 26, 1994, abandoned, which is a continuation of Ser. No. 5,266, Jan. 19, 1993, abandoned, which is a division of Ser. No. 765,894, Sep. 26, 1991, abandoned.

[30] Foreign Application Priority Data

Sep. 28, 1990 [JP] Japan ..................... 2-256877

[51] Int. Cl.⁶ ..................................................... G11B 7/00
[52] U.S. Cl. ........................... 369/44.28; 369/44.32
[58] Field of Search ................ 369/44.34, 44.27, 369/44.28, 44.32, 54, 44.25, 44.29, 44.35; 360/78.04, 78.05, 78.09

[56] References Cited

U.S. PATENT DOCUMENTS

| | | |
|---|---|---|
| 4,788,421 | 11/1988 | Ogawa et al. . |
| 4,896,310 | 1/1990 | Wachi ............................ 369/44.34 |
| 4,940,924 | 7/1990 | Mizuno et al. ................. 360/77.02 |

FOREIGN PATENT DOCUMENTS

| | | |
|---|---|---|
| 0362938 | 4/1990 | European Pat. Off. . |
| 63-268170 | 11/1988 | Japan . |
| 63-304430 | 12/1988 | Japan . |

*Primary Examiner*—Georgia Y. Epps
*Assistant Examiner*—P. W. Huber
*Attorney, Agent, or Firm*—Cushman Darby & Cushman, L.L.P.

[57] ABSTRACT

In a disk reproducing device of this invention for reading out data from a disk by means of a pickup element, a speed signal proportional to the speed of relative movement between the disk and the pickup element is created in a case where the pickup element is moved in the radial direction of the disk according to a high frequency signal (RF) read out from the disk and a tracking error signal (TE) derived from the high frequency signal (RF).

6 Claims, 20 Drawing Sheets

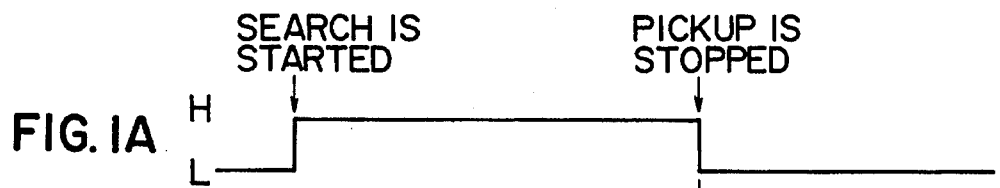
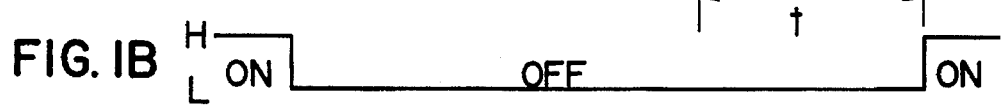
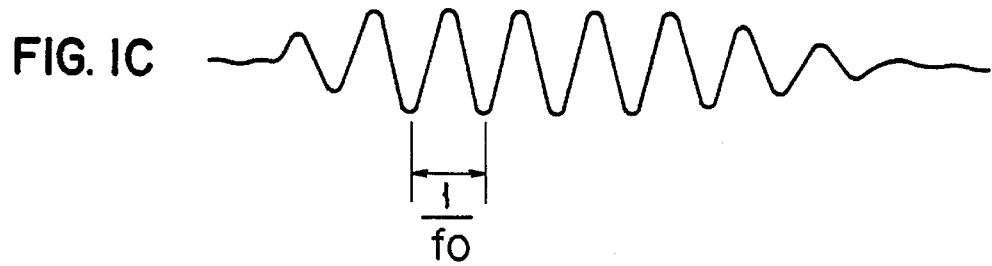
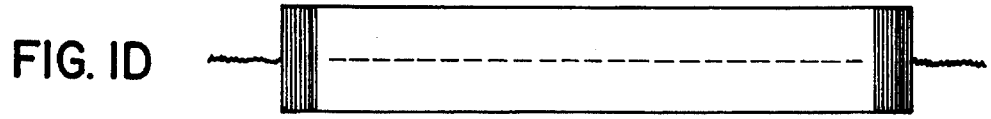
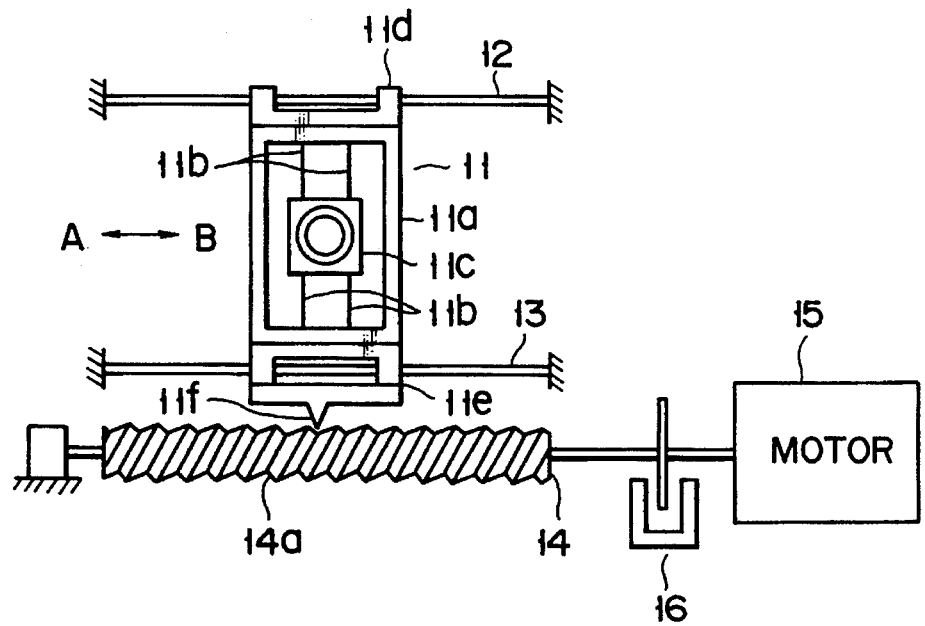
FIG. 2

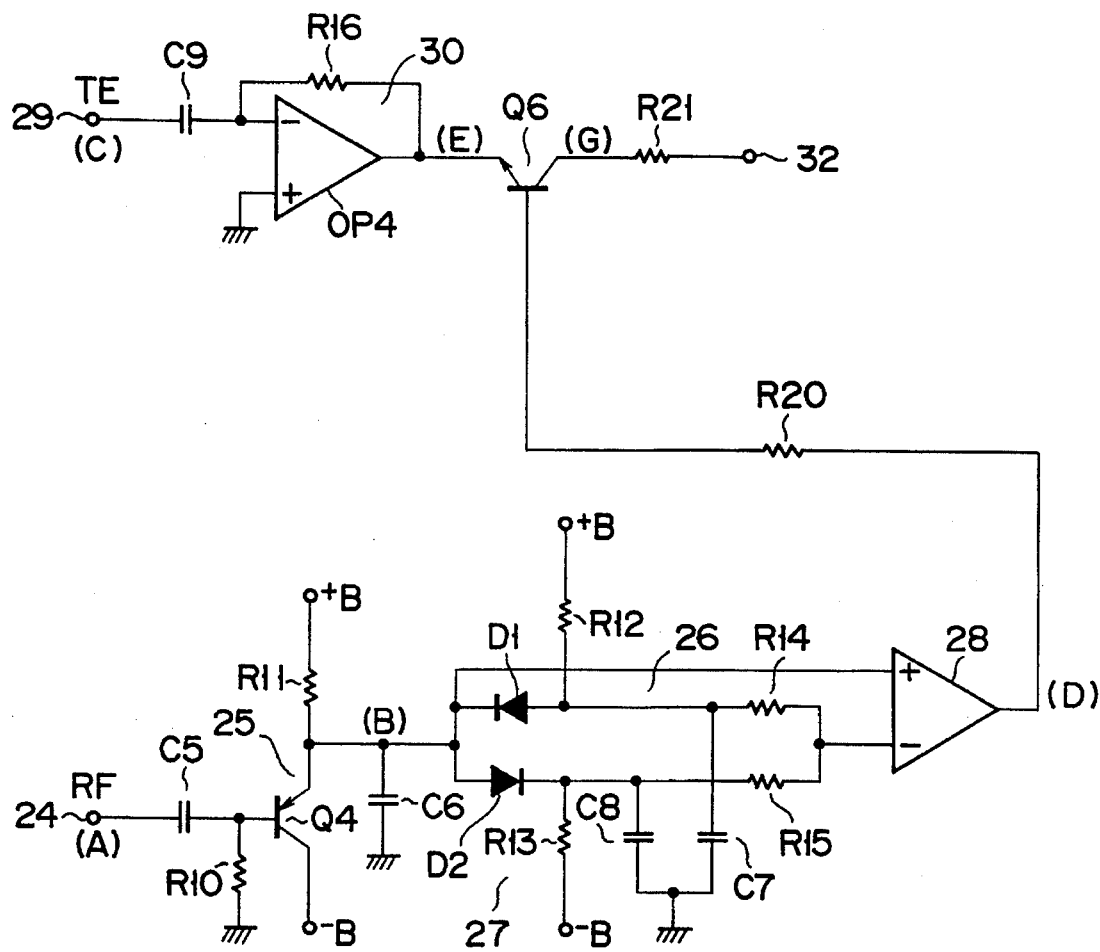
F I G. 8
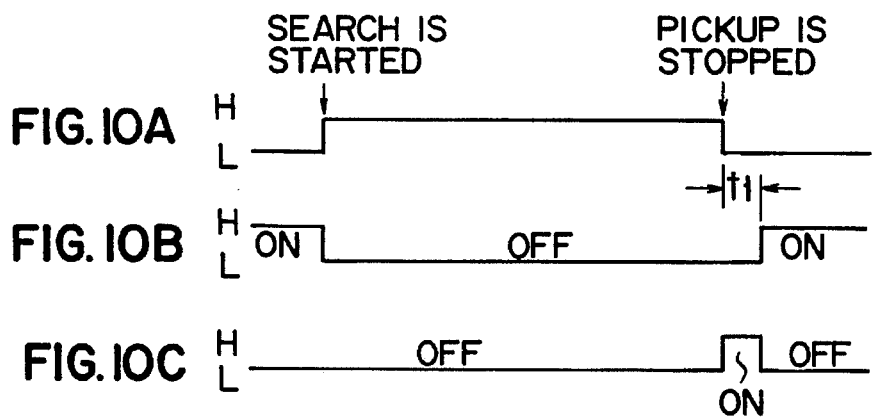

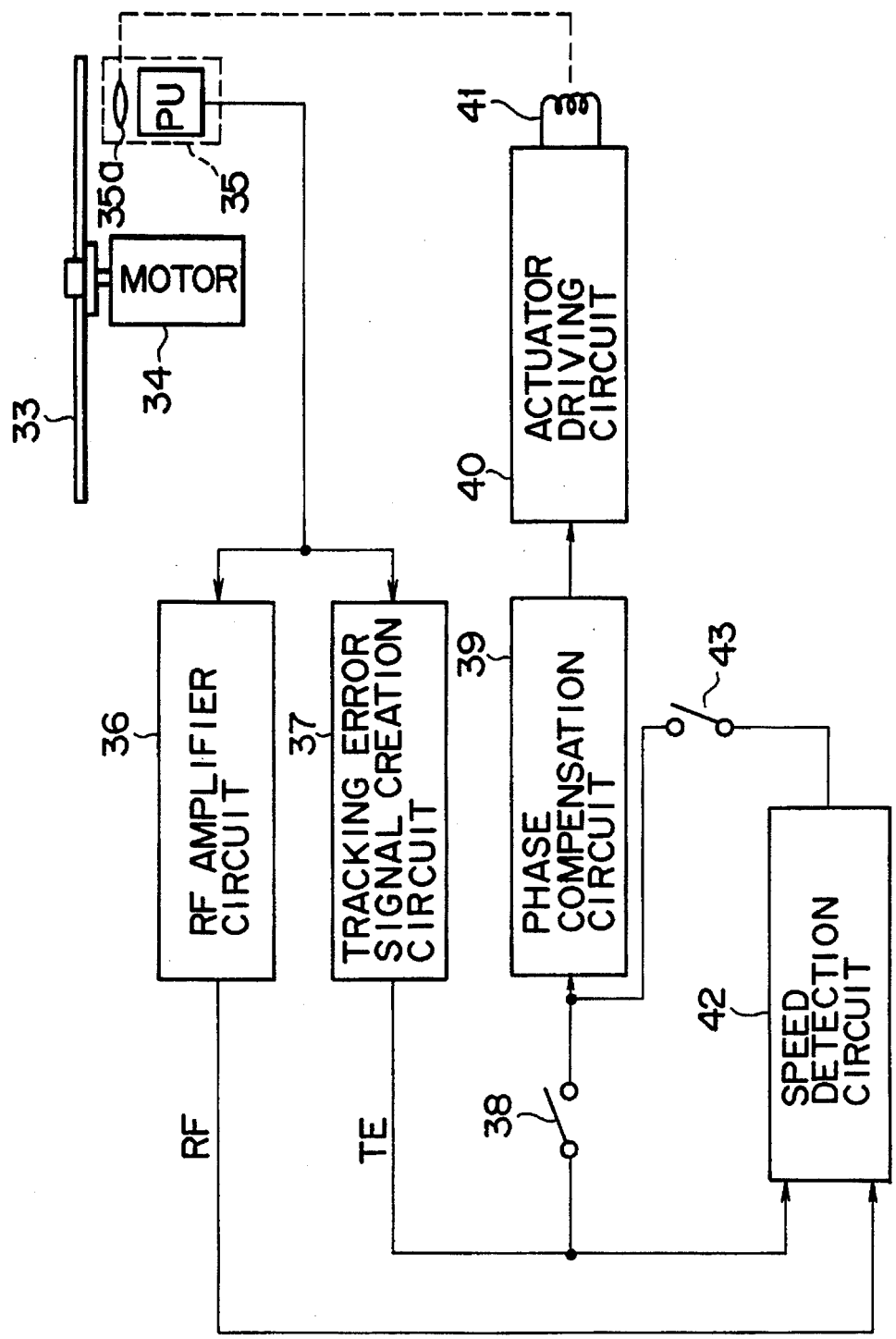
F I G. 9

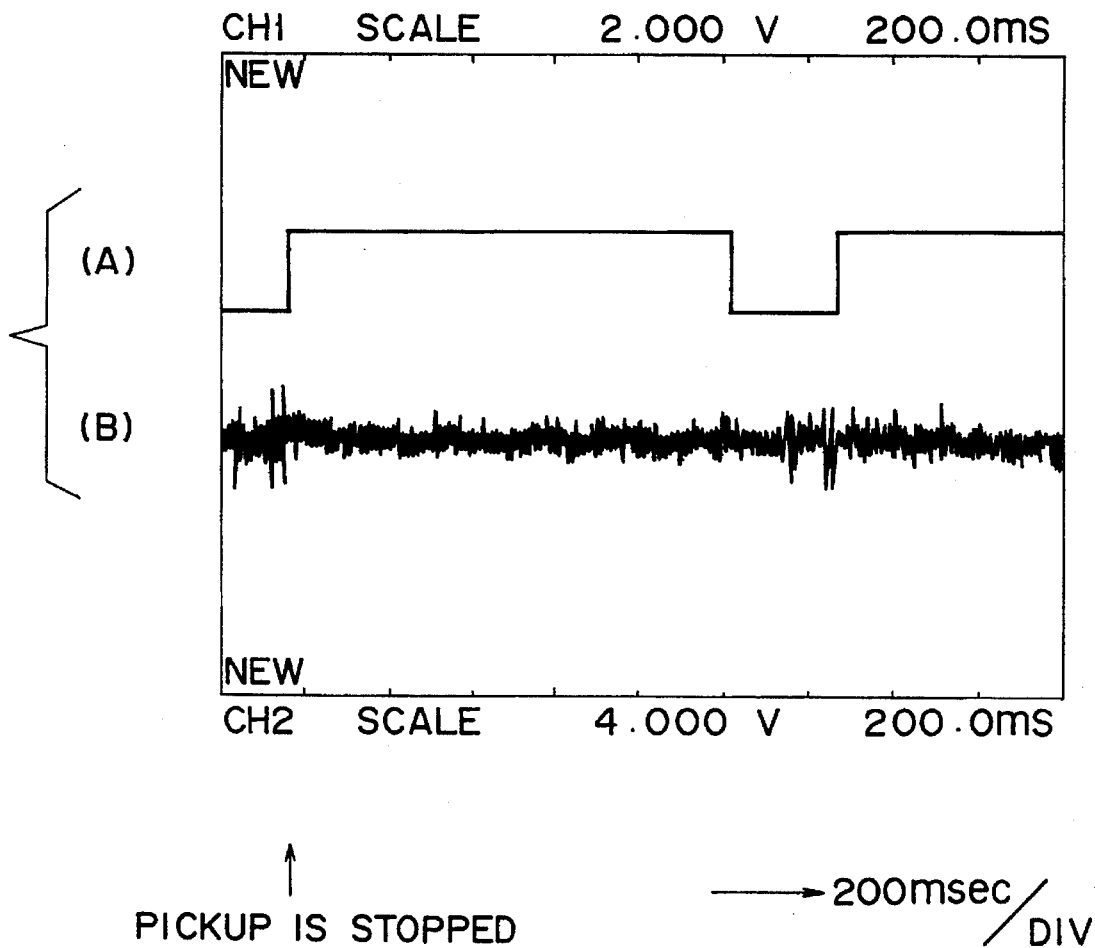
F I G. 13

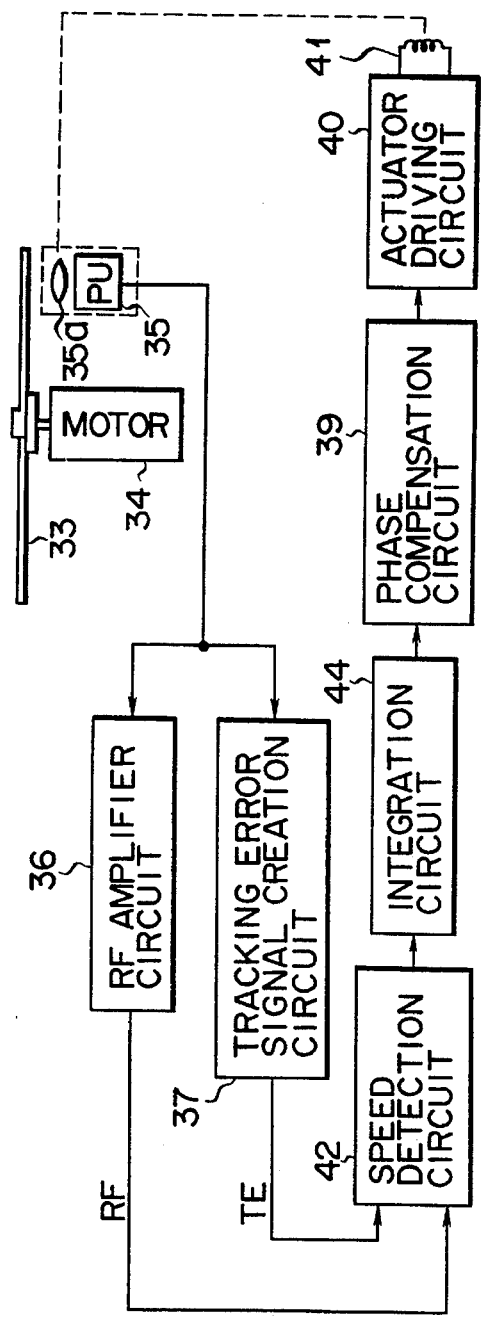
F I G. 18
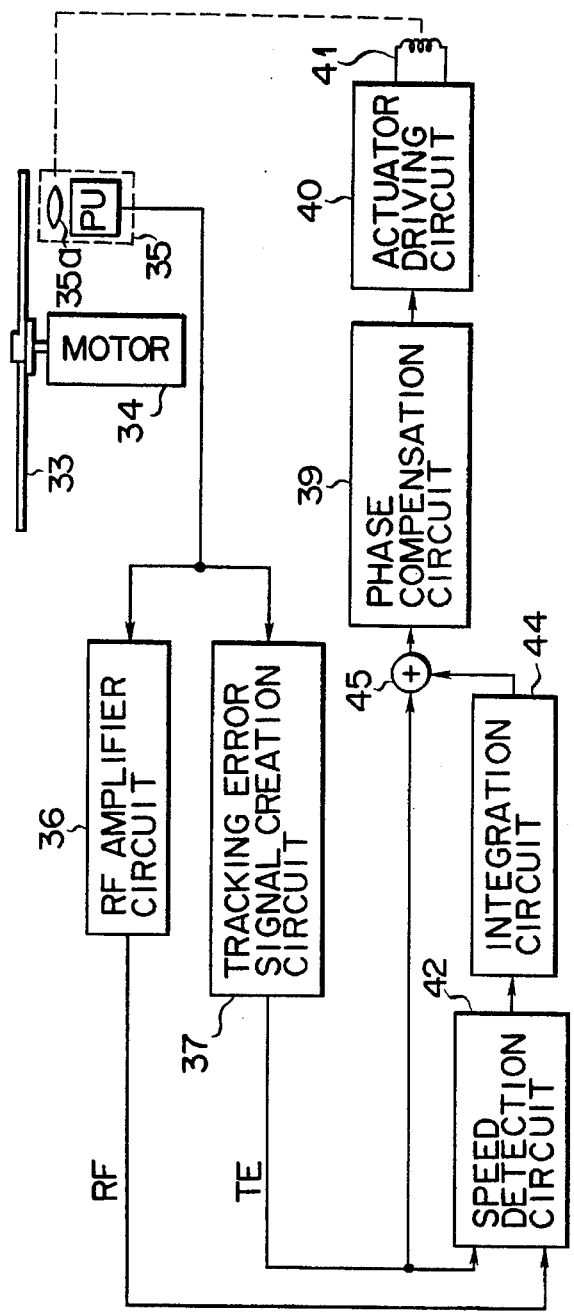
F I G. 19

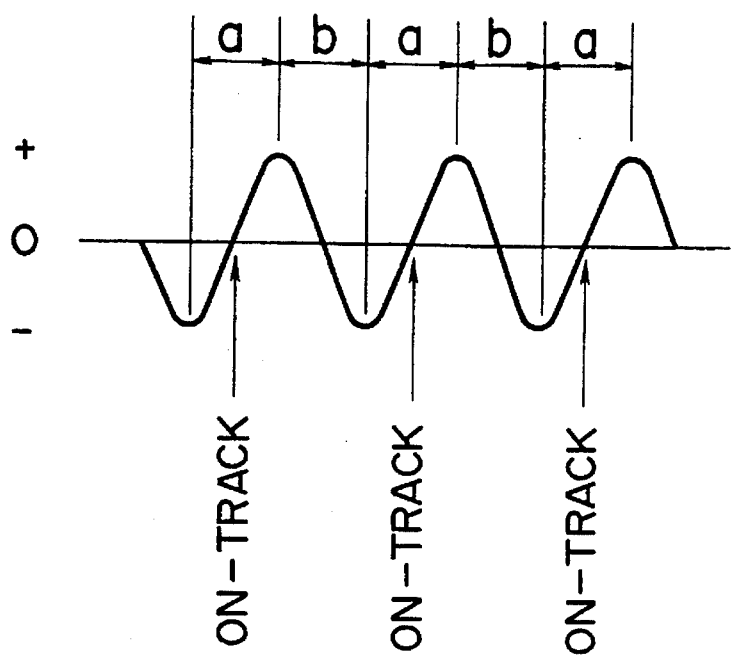
F I G. 20
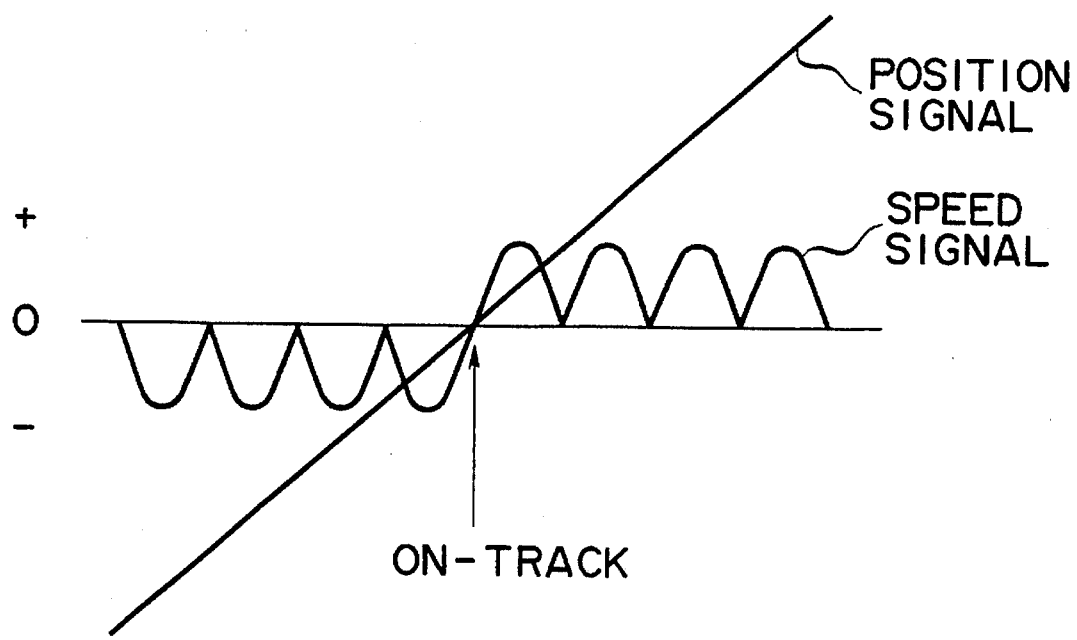
F I G. 21

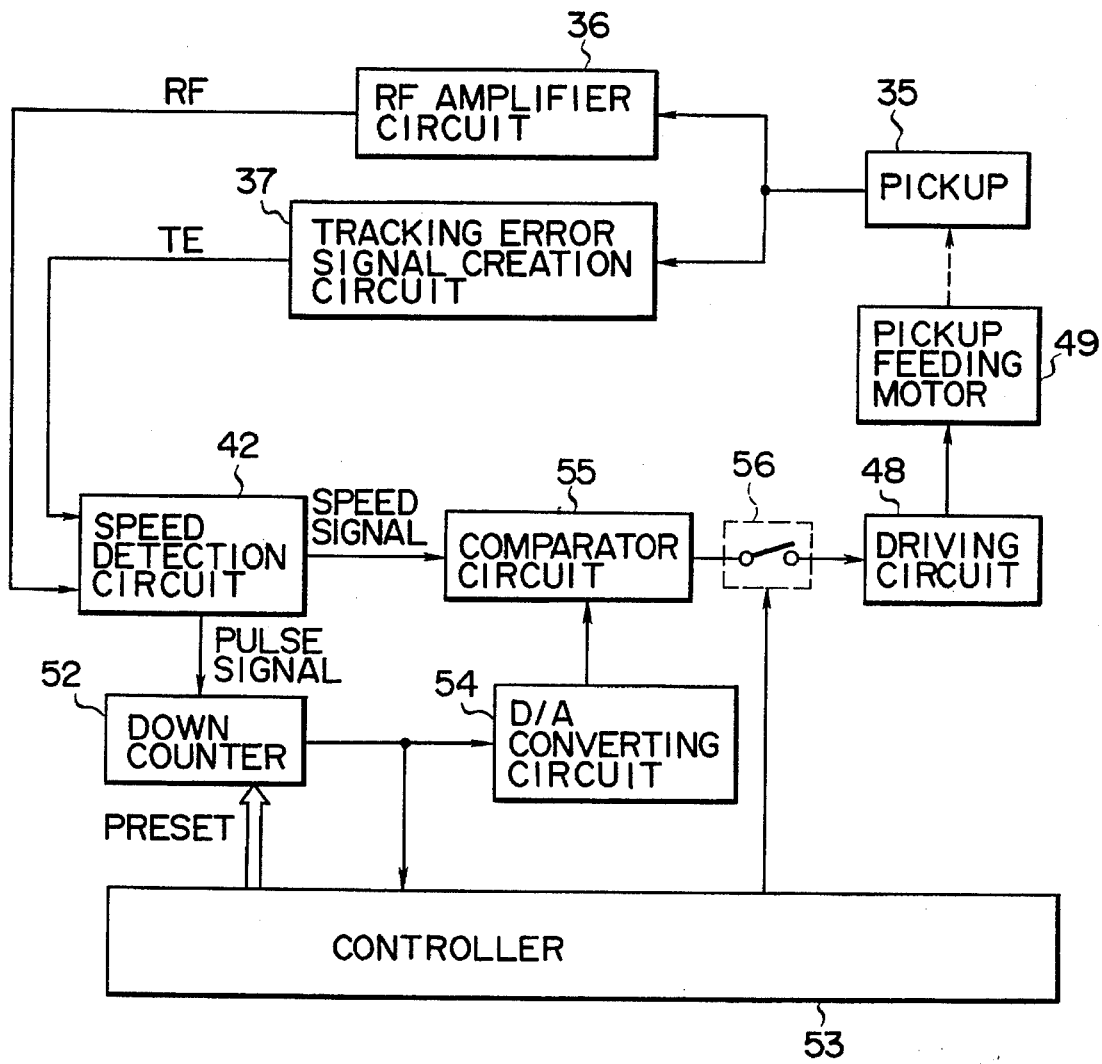
F I G. 25

DEVICE FOR DETECTING TRAVELING SPEED OF PICKUP

This is a continuation of application Ser. No. 08/330,096, filed on Oct. 26, 1994, which was abandoned upon the filing hereof which is a continuation of application Ser. No. 08/005,266, filed Jan. 19, 1993, abandoned, which is a division of application Ser. No. 07/765,894, filed Sep. 26, 1991, abandoned.

BACKGROUND OF THE INVENTION

1. Field of the Invention

This invention relates to a pickup for recording or reproducing data with respect to a disk recording medium, and more particularly to a traveling speed detection device for deriving a speed signal precisely corresponding to the traveling speed thereof.

2. Description of the Related Art

As is well known in the art, in the field of audio instruments and video instruments, digital recording/reproducing systems for converting an information signal such as an audio signal or video signal into digital data, recording the digital data on a recording medium such as a magnetic tape or disk and reproducing the recording medium to derive an original information signal have been widely used. Among the above systems using a disk as a recording medium, for example, an optical reproducing device such as a CD (compact disk) player or VD (video disk) player is now dominantly used. Recently, a data re-programmable optical disk called an additionally recording type optical disk has been put into practice, and optical disk recording/reproducing devices for recording and reproducing data with respect to the additionally recording type optical disks as well as the above-described optical disk reproducing devices have been actively developed.

An optical pickup for recording or reproducing data with respect to the above-described optical disk has a pickup lens which is suspended by means of a wire spring so as to be moved in a tracking direction and focusing direction. Therefore, when external force is applied thereto, the pickup lends tends to vibrate at a fixed frequency of fo determined by it and the wire spring and the amplitude of the vibration is large so that it will take a long time for the vibration to be sufficiently attenuated. This problem is explained by taking, as an example, a so-called search operation in which desired data is searched by moving the pickup in the radial direction of the disk at a high speed.

That is, as shown in FIG. 1(A), when a search control signal is changed from an "L" (low) level to an "H" (high) level to start the search operation, a tracking servo control signal is changed from the "H" level to the "L" level as shown in FIG. 1(B) to set the tracking servo from the ON state to the OFF state, rotate a pickup feeding motor at a high speed and move the pickup in the radial direction of the disk at a high speed. At this time, as shown in FIG. 1(C), the pickup lens vibrates at a fixed period (1/fo), and as shown in FIG. 1(D), the envelope component of the tracking error signal is set at the constant level.

When pulses of a number corresponding to the rotation number of the pickup feeding motor is counted and it is determined that the pickup has reached a target position, then the search control signal is changed from the "H" level to the "L" level to interrupt the rotation of the motor and movement of the pickup. However, even when the movement of the pickup is interrupted, vibration of the pickup lens is not sufficiently attenuated as shown in FIG. 1(C). While the pickup lens is being vibrated, it is impossible to stably set the pickup lens even after the tracking servo is set into the ON state.

Therefore, it is necessary to set the tracking servo into the ON state by inverting the tracking servo control signal from the "L" level to the "H" level after time t from the time the movement of the pickup is interrupted until the vibration of the pickup is naturally attenuated has elapsed. For this reason, a period from the time the movement of the pickup is interrupted until the tracking servo is set into the ON state for the reproducing operation becomes longer because of the presence of wait time t and it takes a long time to effect the search operation.

In order to reduce the search time by setting the wait time t as short as possible, it has been proposed to use means for forcedly stopping the vibration by conducting current in a tracking actuator coil for driving the pickup lens in the tracking direction to move the pickup lens in a direction opposite to the vibration direction or means for detecting the speed component of the pickup lens based on an output or a sensor mounted for detecting the relative movement between the pickup and the pickup lens and feeding back the detection result to the tracking actuator coil.

However, when the former means is used, it is difficult to determine the direction and magnitude of the vibration of the pickup lens, and therefore, the pickup lens may be made to vibrate to a larger extent and it is impossible to suppress the vibration when the pickup is vibrated by externally applied impact. Further, when the latter means is used, the sensor is used, and therefore, the construction of the pickup becomes complicated, large and economically disadvantageous.

SUMMARY OF THE INVENTION

This invention has been made in view of the above problems, and an object of this invention is to provide a device for detecting the traveling speed of a pickup in which a speed signal precisely corresponding to the traveling speed of the pickup is derived and which has a simple construction.

Further, another object of this invention is to provide a device in which a speed signal precisely corresponding to the traveling speed of a pickup element is derived and used for rapidly attenuating vibration of the pickup element to reduce the searching time after the search operation is completed and which is simple in construction.

Still another object of this invention is to provide a device in which a speed signal precisely corresponding to the traveling speed of a pickup element is derived and used to effect the tracking servo of the pickup element and which is simple in construction.

Further, another object of this invention is to provide a device in which a speed signal precisely corresponding to the traveling speed of a pickup element is derived and used to control the traveling speed of the pickup element and which is simple in construction.

Another object of this invention is to provide a device in which a speed signal precisely corresponding to the traveling speed of a pickup element is derived and used to effect the track jumping operation for moving the pickup element by a preset distance and which is simple in construction, According to one aspect of the present invention, there is provided a disk reproducing device for reading out data from a disk by means of a pickup element, comprising speed detection means for creating a speed signal proportional to the relative movement speed of the pickup element with respect to the disk in a case where the pickup element is moved in the radial direction of the disk according to a high frequency signal read out from the disk and a tracking error signal derived from the high frequency signal, wherein a speed signal precisely corresponding to the traveling speed of the pickup element can be derived in a simple construction.

Further, in this invention, integrating means for integrating a speed signal output from the speed detection means to create a position signal of the pickup element and servo means for controlling the pickup element in a tracking direction based on the position signal output from the integrating means to effect the tracking servo are provided so that the tracking servo of the pickup element can be effected.

In addition, in this invention, comparing means for comparing the speed signal output from the speed detection means with a reference signal is provided so that the traveling speed of the pickup element can be controlled based on the output of the comparing means.

Further, in this invention, creation means for creating a tracking error signal based on a high-frequency signal read out from the disk by the pickup element, servo means for controlling the pickup element in the tracking direction and subjecting the pickup element to the tracking servo according to the tracking error signal created by the creation means, searching means for moving the pickup element in the radial direction of the disk to search desired data, switching means for setting the servo means into the OFF state while the pickup element is moved by the searching means, speed detection means for creating a speed signal which is proportional to the speed of relative movement between the disk and the pickup element which is set in the moving state according to the high-frequency signal and the tracking error signal, and braking means for suppressing vibration of the pickup element by supplying the speed signal output from the speed detection means instead of the tracking error signal to the servo means while the pickup element is set in the stopped state are provided so that vibration of the pickup element can be quickly attenuated after the searching operation is completed, thereby making it possible to reduce the searching time.

BRIEF DESCRIPTION OF THE DRAWINGS

FIGS. 1(A) to 1(D) are diagrams for illustrating an operation from the start of a searching operation to the end thereof;

FIG. 2 is a view for illustrating the concrete construction of an optical pickup and the feeding mechanism thereof;

FIG. 8 is a circuit diagram showing the construction obtained by partly modifying the above embodiment of FIG. 6;

FIG. 9 is a block diagram showing an example of the construction for effecting the searching operation by applying this invention;

FIGS. 10(A) to 10(C) are waveform diagrams of various points for illustrating the searching operation;

FIGS. 13(A) and 13(B) are concrete waveform diagrams of a control signal and a speed signal measured when braking force is applied to the vibration of the pickup lens after the movement of the optical pickup is interrupted;

FIG. 18 is a block diagram showing an example of the construction for effecting the tracking servo by using this invention;

FIG. 19 is a block diagram showing another example of the construction for effecting the tracking servo by using this invention;

FIGS. 20 and 21 are characteristic diagrams showing a difference between the tracking servo effected by use of a tracking error signal and the tracking servo effected by use of a position signal;

FIG. 25 is a block diagram showing an example of the construction for controlling the track jumping operation of the pickup lens by using this invention.

DETAILED DESCRIPTION OF THE PREFERRED EMBODIMENTS

Figure 3:
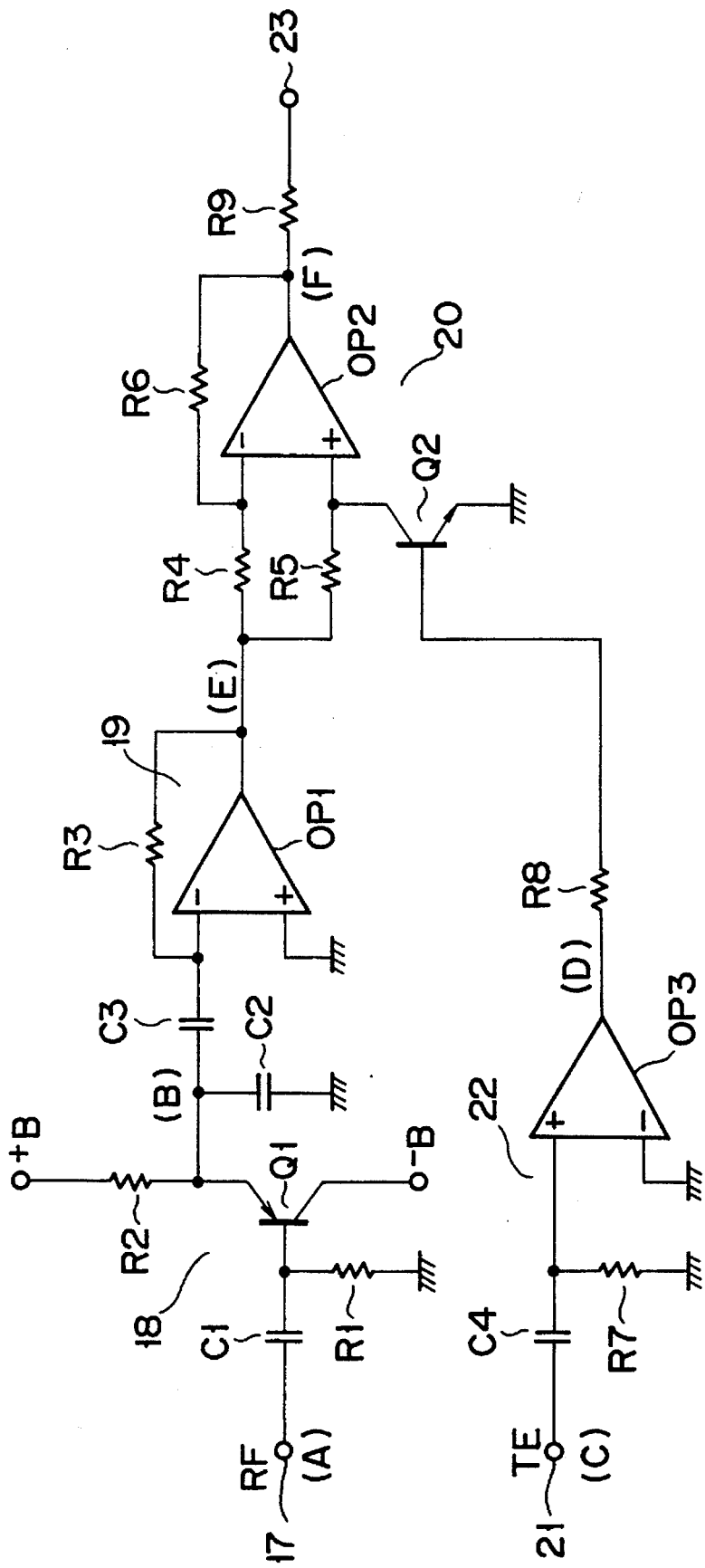
FIG. 3 is a circuit diagram showing one embodiment of a traveling speed detection device of a pickup according to this invention.

There will now be described an embodiment of this invention with reference to the accompanying drawings. FIG. 2 shows the construction of an optical pickup used in a CD player and a feeding mechanism therefor. An optical pickup 11 includes a pickup body 11a formed in substantially a rectangular frame form and a pickup lens 11c used as a pickup element, suspended to the central portion of the pickup body 11a by means of four wire springs 11b and supported to move in a focusing direction and tracking direction of the disk (not shown). In this case, actuator coils for moving the pickup lens 11c in the tracking and focusing directions are omitted in FIG. 2.

A pair of shafts 12 and 13 which are set in parallel with each other are inserted into the supporting members 11d and 11e provided in the upper and lower positions of the optical pickup in the drawing so that the optical pickup 11 can be supported to freely move in the tracking direction or directions indicated by arrows A and B. Further, a gear shaft 14 having a spiral gear 14a formed on the peripheral surface thereof is set along the traveling direction of the optical pickup 11 in position below the optical pickup 11 in the drawing. A nail 11f formed to project on the lower portion of the optical pickup 11 in the drawing is set in contact with the groove of the spiral gear 14a of the gear shaft 14 so that the optical pickup 11 can be moved in the tracking direction when the gear shaft 14 is rotated around its axis by a motor 15. The number of revolutions of the gear shaft 14 is measured by a pulse generator 16 and thus the gear shaft 14 is used for measuring the traveling distance of the optical pickup 11.

FIGS. 3 and 4 show the construction of a circuit for detecting the traveling speed of the optical pickup 11 and waveforms of respective portions of the circuit in the searching operation. In FIG. 3, a reference numeral 17 denotes an input terminal to which a signal such as an RF (high frequency) signal shown in FIG. 4(A) and obtained by reproducing a disk (not shown) is supplied. The RF signal waveform shown in FIG. 4(A) indicates an RF signal obtained while the optical pickup 11 is crossing the track of the disk. That is, the period T of variation in the amplitude of the RF signal becomes shorter as the optical pickup 11 crosses the track at a higher speed and the period T of variation in the amplitude of the RF signal becomes longer as the optical pickup 11 crosses the track at a lower speed. A large amplitude portion of the RF signal indicates the on-track state in which the light beam irradiated from the optical pickup 11 lies on the track of the disk and a small amplitude portion of the RF signal indicates the off-track state in which the light beam irradiated from the optical pickup 11 does not lie on the track of the disk.

Figure 4A:
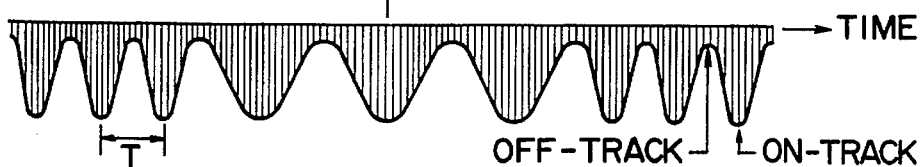
FIGS. 4(A) to 4(G) are waveform diagrams for illustrating the operation of the above embodiment.
Figure 4B:
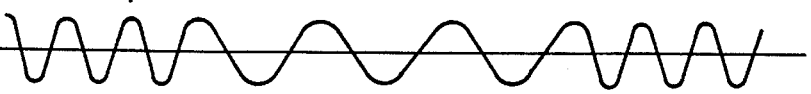

The RF signal supplied to the input terminal 17 is supplied to a detector circuit 18 constructed by resistors R1 and R2, capacitors C1 and C2 and a PNP transistor Q1 and a low frequency component is extracted as shown in FIG. 4(B). The low frequency component of the RF signal extracted by the detector circuit 18 is supplied to a differential circuit 19 of next stage which is constructed by a resistor R3, capacitor C3 and operation amplifier OP1 and differentiated as shown in FIG. 4(E). In the differential circuit 19 of FIG. 3, when the low frequency signal shown in FIG. 4(B) is supplied, a differential signal having a polarity opposite to that of the waveform shown in FIG. 4(E) is actually derived. In FIG. 4(E), a differential waveform having a polarity opposite to the actual polarity is shown in order to simplify the explanation and it raises no problem in explaining the operation. After this, the differential signal is supplied to a rectifier circuit 20 constructed by resistors R4 to R6, NPN transistor Q2 and operation amplifier OP2.

Figure 4C:
Figure 4D:
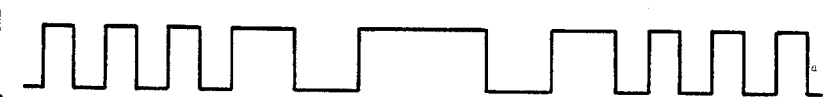
Figure 4E:
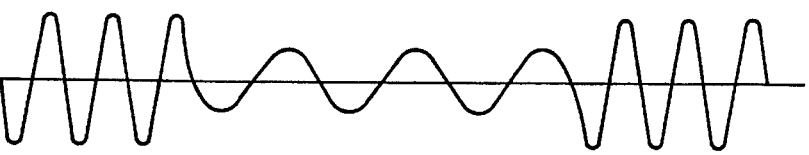

A reference numeral 21 in FIG. 3 denotes an input terminal to which a tracking error signal TE shown in FIG. 4(C) is supplied. The tracking error signal TE is set to "0" level in the on-track point and off-track point and variation in the amplitude thereof has an electrical phase difference of 90° with respect to that of the RF signal. For this reason, the tracking error signal and the above differential signal are set substantially in phase with each other. The tracking error signal TE supplied to the input terminal 21 is supplied to a comparator circuit 22 constructed by a resistor R7, capacitor C4 and operation amplifier OP3, compared with the ground level and converted into a pulse signal as shown in FIG. 4(D). The pulse signal is supplied to the base of the transistor Q2 constituting the rectifier circuit 20 via a resistor R8 as a timing signal for controlling the rectifying operation of the rectifier circuit 20.

Figure 4F:
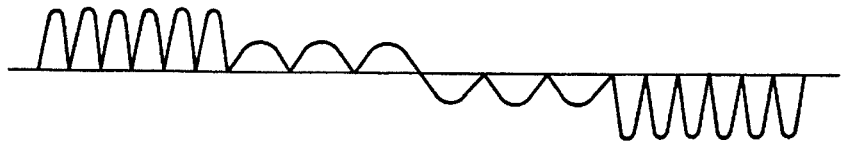

The rectifier circuit 20 subjects a differential signal output from the differential circuit 19 to the full-wave rectification by controlling the conduction state of the transistor Q2 according to the pulse signal. That is, in the rectifier circuit 20, the resistances of the resistors R4 and R6 are set equal to each other, and the operation amplifier OP2 is controlled to invert the polarity of the differential signal while the pulse signal is set at the "H" level or the transistor Q2 is set in the ON state and does not invert the polarity of the differential signal while the pulse signal is set at the "L" level or the transistor Q2 is set in the OFF state so as to create a speed signal as shown in FIG. 4(F). Then, the speed signal is derived from an output terminal 23 via a resistor R9. The speed signal shown in FIG. 4(F) varies in proportion to the speed of relative movement between the track of the disk and the pickup lens 11c, and the peak value thereof becomes larger as the traveling speed is higher and the period T of variation in the amplitude of the RF signal is shorter, that is, the frequency of the low frequency component of the RF signal is higher and the peak value thereof becomes smaller as the frequency of the low frequency component of the RF signal is lower. In this case, the polarity thereof is inverted when the traveling direction of the pickup lens 11c is reversed.

Therefore, according to the traveling speed detection circuit shown in FIG. 3, it is not necessary to use a sensor or the like unlike the conventional case, and a speed signal precisely corresponding to the traveling speed of the optical pickup 11 can be obtained with a simple construction.

Figure 4G:
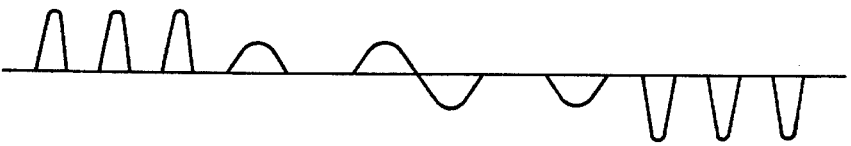
Figure 5:
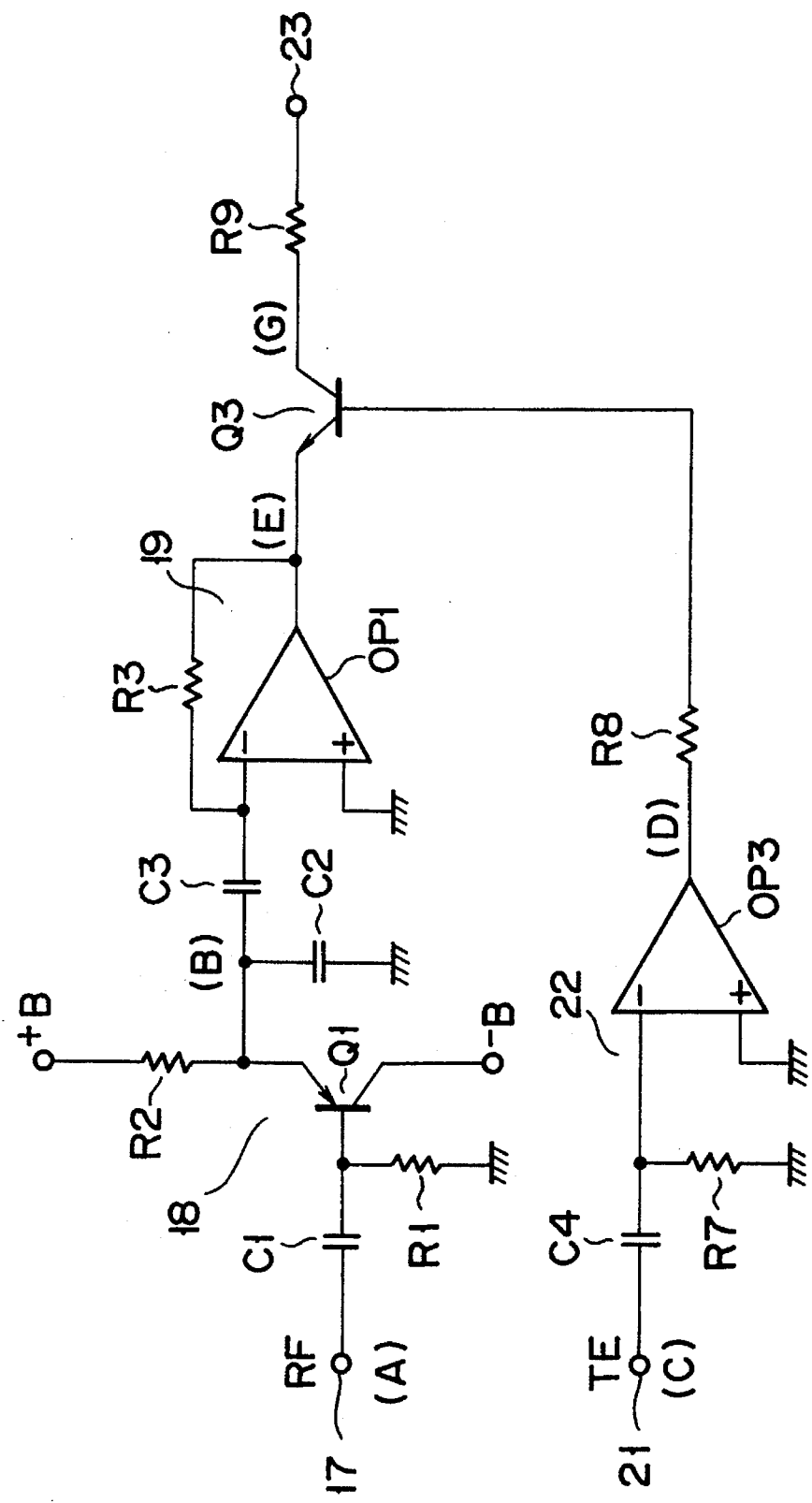
FIG. 5 is a circuit diagram showing the construction obtained by partly modifying the above embodiment.

In this case, as shown in FIG. 5, a signal obtained by subjecting a differential signal to a half-wave rectification by use of an NPN transistor Q3 whose conduction state is controlled by the pulse signal and inverting the polarity of the differential signal only when the pulse signal is set at the "H" level as shown in FIG. 4(G) may be used as the speed signal. The speed signal shown in FIG. 4(G) has substantially the same characteristic as the speed signal shown in FIG. 4(F).

Figure 6:
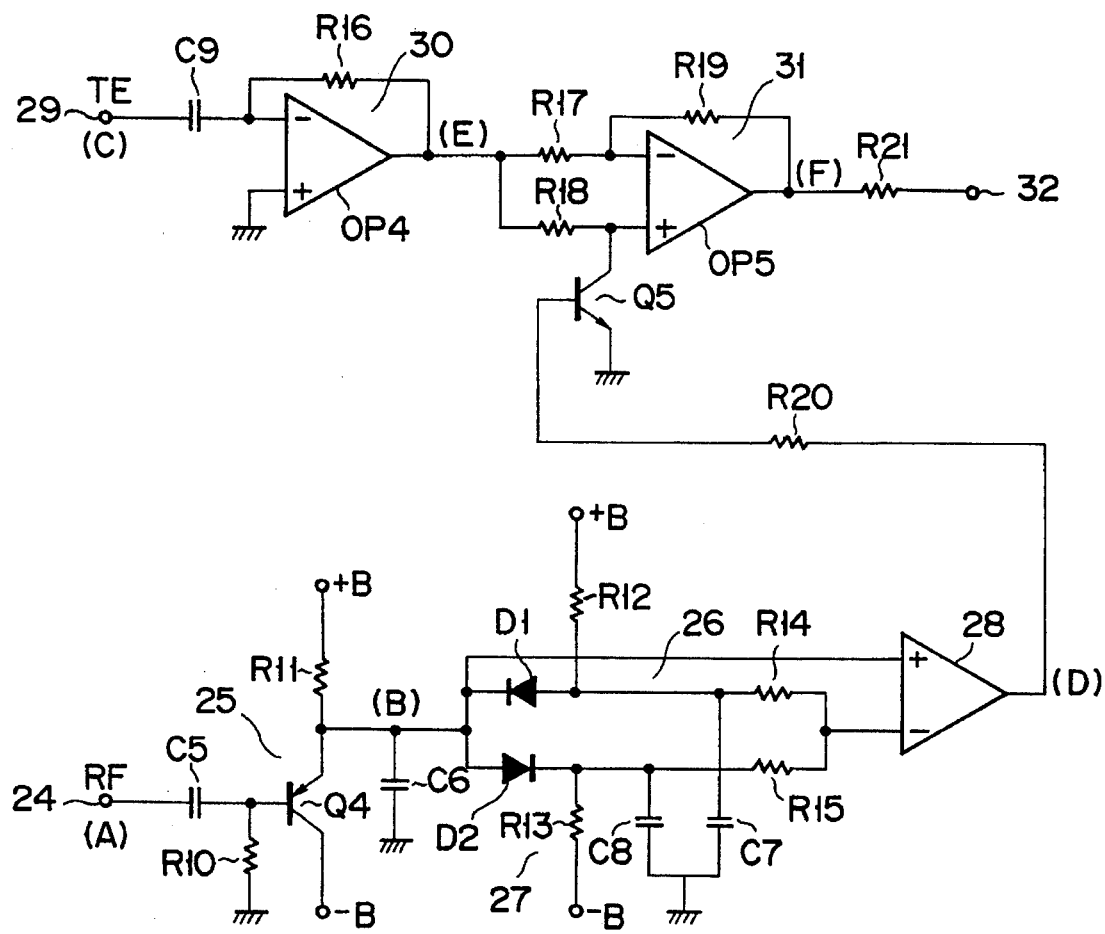
FIG. 6 is a circuit diagram showing another embodiment of a traveling speed detection device of a pickup according to this invention.
Figure 7A:
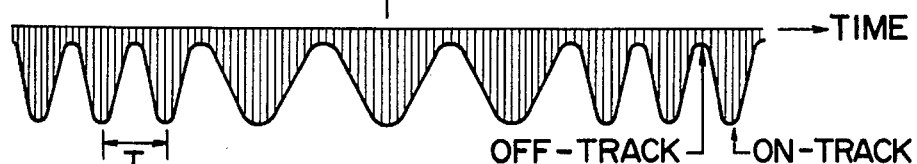
FIGS. 7(A) to 7(G) are waveform diagrams for illustrating the operation of the above embodiment of FIG. 6.

In the traveling speed detection circuits shown in FIGS. 3 and 5, the speed signal is created by using the RF signal as a main component, but the speed signal can be created by using the tracking error signal TE as a main component. FIGS. 6 and 7 respectively show the construction of a traveling speed detection circuit for creating the speed signal by using the tracking error signal TE as a main component and waveforms of respective points in the circuit in the searching operation. In FIG. 6, a reference numeral 24 denotes an input terminal to which an RF signal shown in FIG. 7(A) is supplied. The RF signal waveform shown in FIG. 7(A) is similar to the RF signal shown in FIG. 4(A).

Figure 7B:
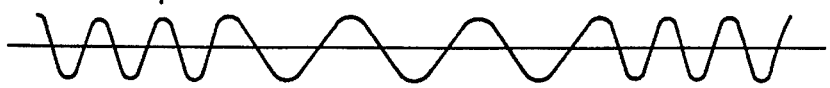

The RF signal supplied to the input terminal 24 is supplied to a detector circuit 25 constructed by resistors R10 and R11, capacitors C5 and C6 and PNP transistor Q4 and a low frequency component as shown in FIG. 7(B) is extracted therefrom. Since the amplitude level of the low frequency component of the RF signal extracted by the detector circuit 25 is varied by variation in the reflection coefficient of the disk, stains on the disk and the like, a bottom holding circuit 26 constructed by a diode D1, resistor R12 and capacitor C7 and a peak holding circuit 27 constructed by a diode D2, resistor R13 and capacitor C3 are used to hold the bottom level and peak level, add the thus held levels together by use of resistors R14 and R15 and derive the intermediate level between them. Then, a comparison circuit 28 is used to subject the low frequency component of the RF signal output from the detector circuit 25 to the level-slicing operation by use of the thus derived intermediate level so as to derive a pulse signal as shown in FIG. 7(D). In this case, the resistances of the resistors R14 and R15 are set equal to each other.

Figure 7C:
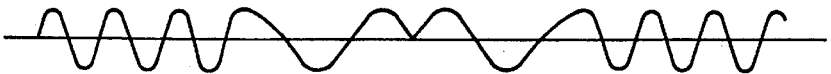
Figure 7D:
Figure 7E:
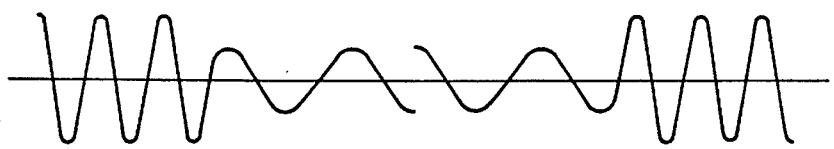

A reference numeral 29 in FIG. 6 denotes an input terminal to which a tracking error signal TE shown in FIG. 7(C) is supplied. The tracking error signal TE is similar to the tracking error signal TE shown in FIG. 4(C). The tracking error signal TE supplied to the input terminal 29 is supplied to a differential circuit 30 constructed by a resistor R16, capacitor C9 and operation amplifier OP4 and converted into a differential signal as shown in FIG. 7(E). In the differential circuit 30 with the construction shown in FIG. 6, when the tracking error signal TE shown in FIG. 7(E) is supplied, a differential signal having a polarity opposite to that of the waveform shown in FIG. 7(E) is actually derived. In FIG. 7(E), a differential waveform having a polarity opposite to the actual polarity is shown in order to simplify the explanation and it raises no problem in explaining the operation. The differential signal is supplied to a rectifier circuit 31 constructed by resistors R17 to R19, NPN transistor Q5 and operation amplifier OP5.

Figure 7F:
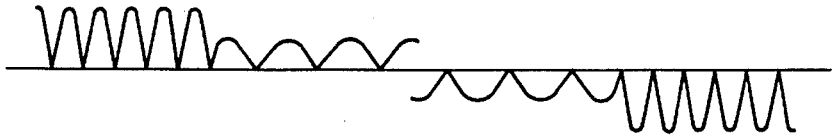

The rectifier circuit 31 subjects a differential signal output from the differential circuit 30 to the full-wave rectification by controlling the conduction state of the transistor Q5 according to a pulse signal output from the comparator circuit 28 via the resistor R19 to the base thereof so as to create a speed signal shown in FIG. 7(F). The speed signal is derived from an output terminal 32 via a resistor R21. The speed signal shown in FIG. 7(F) has the same characteristic as the speed signal shown in FIG. 4(F).

Figure 7G:
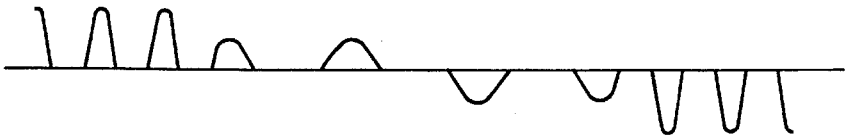

As shown in FIG. 8, a differential signal may be subjected to the half-wave rectification by means of an NPN transistor Q6 whose conduction state is controlled by the pulse signal and the differential signal may be derived only when the pulse signal is set at the "H" level as shown in FIG. 7(G) and may be used as the speed signal. The speed signal shown in FIG. 7(G) has substan-tially the same characteristic as the speed signal shown in FIG. 7(F).

FIG. 9 shows an example of a circuit for effecting the searching operation by use of the speed signal derived in the above-described manner. In FIG. 9, a reference numeral 33 denotes a disk which is rotated by means of a motor 34 so that recorded data may be read out from the disk by means of a pickup lens 35a of an optical pickup 35. An RF component of a signal obtained from the optical pickup 35 is amplified by an RF amplifier 36. Further, a tracking error component of a signal derived from the optical pickup 35 is supplied to a tracking error signal generation circuit 37 and used for creating a tracking error signal TE. When the optical pickup 35 is a 3-beam type, signals generated by two sub-beams are used as tracking error components.

In the normal reproduction state of the disk 33, a tracking servo loop in which the tracking signal TE is supplied to a tracking actuator coil 41 for driving the pickup lens 35a in the tracking direction via a switch 38, phase compensation circuit 39 and actuator driving circuit 40 is constructed and the tracking servo is effected.

The tracking error signal TE and an RF signal output from the RF amplifier circuit 36 are supplied to a speed detection circuit 42. As described before, the speed detection circuit 42 creates a speed signal which is proportional to the speed of relative movement between the track of the disk 33 and the pickup lens 35a according to the RF signal and tracking error signal TE. The speed signal is supplied to the tracking actuator coil 41 via the switch 43, phase compensation circuit 39 and actuator driving circuit 40 to apply braking force to the pickup lens 35a in a direction to suppress the vibration of the pickup lens.

That is, when the search control signal shown in FIG. 10(A) is changed from the "L" level to the "H" level to start the searching operation, the tracking servo control signal shown in FIG. 10(B) is inverted from the "H" level to the "L" level and the switch 38 is set from the ON state to the OFF state. Then, the tracking servo is set from the ON state to the OFF state and the pickup 35 is moved at a high speed in a preset tracking direction. At this time, as shown in FIG. 10(C), the switch control signal for controlling the switch 43 is kept at the "L" level and the switch 43 is kept in the OFF state. For this reason, in the searching operation, neither the tracking error signal TE nor the speed signal is supplied to the tracking actuator coil 41 so that the pickup lens 35a may be set in a freely movable state.

When it is determined that the optical pickup 35 has reached the target position, the search control signal is inverted from the "H" level to the "L" level and the movement of the optical pickup 35a is stopped. At this time, the tracking servo control signal is kept at the "L" level and the switch control signal is inverted from the "L" level to the "H" level and only the switch 43 is set from the OFF state to the ON state so that the speed signal output from the speed detection circuit 42 is negatively fed back to the tracking actuator coil 41 via the switch 43, phase compensation circuit 39 and actuator driving circuit 40 and braking force may be applied to the pickup lens 35a in a direction to suppress the vibration of the pickup lens. After time t1 for the vibration of the pickup lens 35a to be forcedly attenuated, the tracking servo control signal is inverted from the "L" level to the "H" level so as to set the tracking servo into the ON state.

With the above construction, when the searching operation is completed and the movement of the optical pickup 35 is interrupted, braking force is applied to the pickup lens 35a in a direction to suppress the vibration of the pickup lens according to a speed signal which is proportional to the speed of relative movement between the track of the disk 33 and the pickup lens 35a so that vibration of the pickup lens 35a can be rapidly attenuated after the movement of the optical pickup 35 is interrupted. Therefore, the time t1 from the time the movement of the optical pickup 35 is interrupted until the tracking servo is set into the ON state can be made shorter than the conventional wait time t, thereby reducing the searching time.

Figure 11:
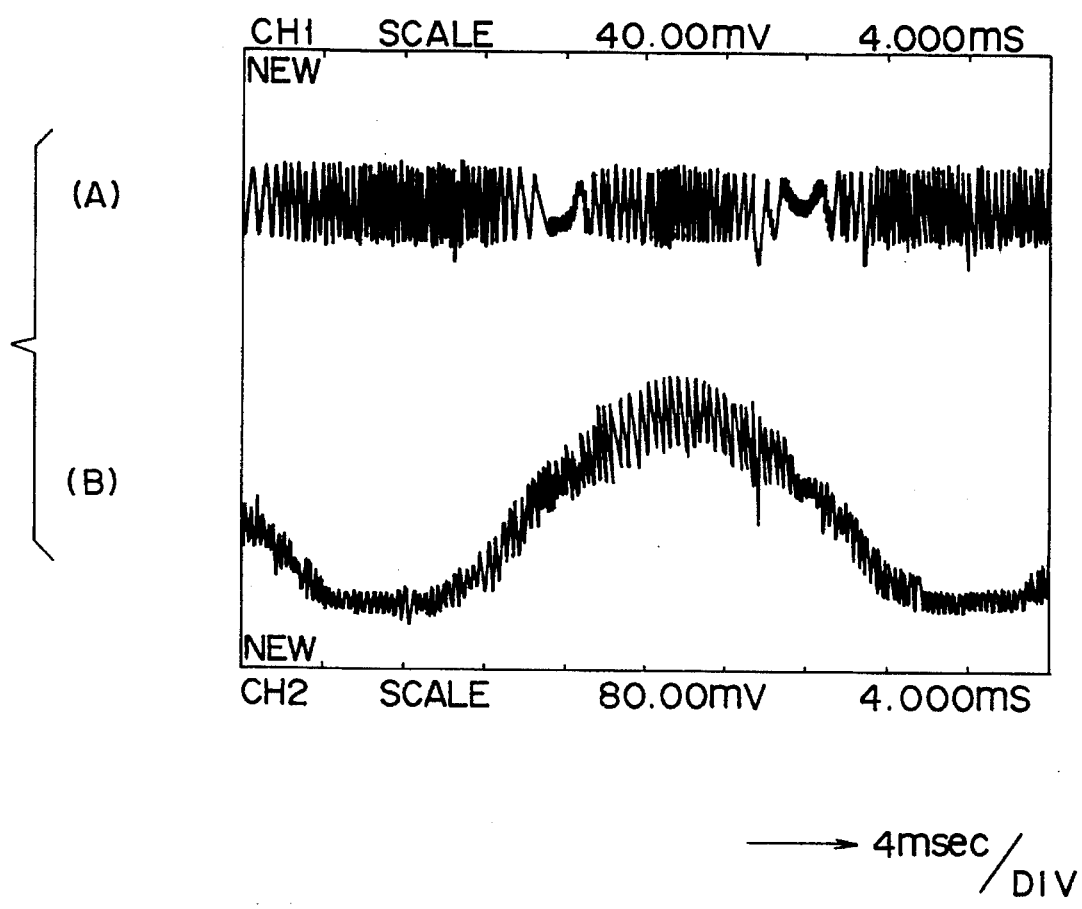
FIGS. 11(A) and 11(B) are concrete waveform diagrams of an RF detection signal and a speed signal measured when the pickup lens is vibrated by application of vibration from the exterior.

Next, the experimental result obtained by measuring signal waveforms of various portions of a circuit which is actually manufactured according to the circuit of FIG. 9 is explained. FIGS. 11(A) and 11(B) respectively show an RF detection signal and a speed signal obtained when the switches 38 and 43 are set in the OFF state and external vibration is applied to the optical pickup to vibrate the pickup lens 35a. In this case, it is understood that the pickup lens 35a vibrates in the tracking direction at an inherent frequency of and the variation speed is high or the amplitude of the speed signal is small in the high-frequency portion of the RF detection signal. Further, it is understood that if the traveling direction of the pickup lens 35a is reversed, the polarity of the speed signal is inverted. The polarity inverting period of the speed signal is 1/fo.

Figure 12:
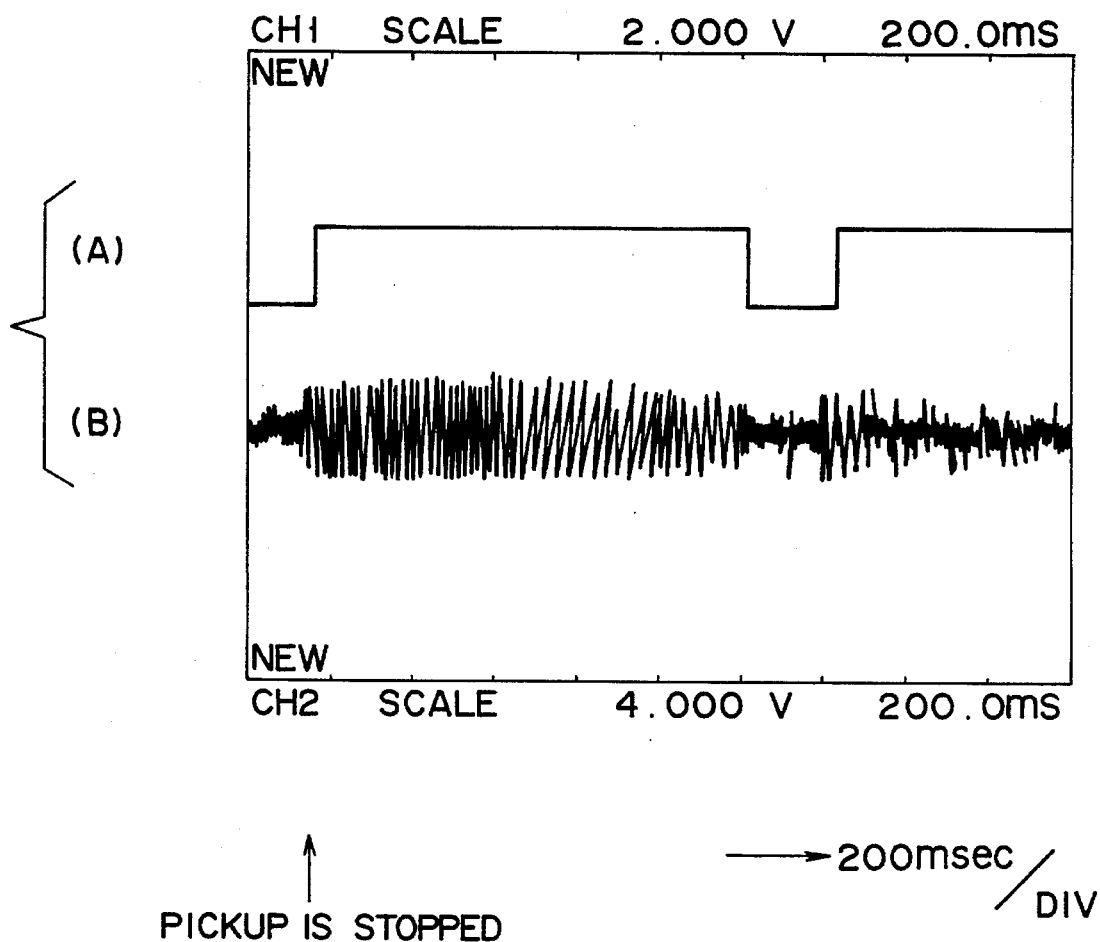
FIGS. 12(A) and 12(B) are concrete waveform diagrams of a control signal and a speed signal measured when the optical pickup is moved at a high speed and then stopped.

FIGS. 12(A) and 12(B) respectively show a control signal and a speed signal obtained when the switches 38 and 43 are set in the OFF state and the optical pickup 35 is moved in one direction at a high speed for 160 milliseconds and then stopped. In this case, suppose that the optical pickup 35 is moved at a high speed while the control signal is set at the "L" level and the movement of the optical pickup 35 is interrupted when the control signal is changed from the "L" level to the "H" level. It is understood by referring to the speed signal of FIG. 12(B) that vibration of the pickup lens 35a starts to be attenuated when approx. 1 second has elapsed after the optical pickup 35 is stopped.

Figure 14:
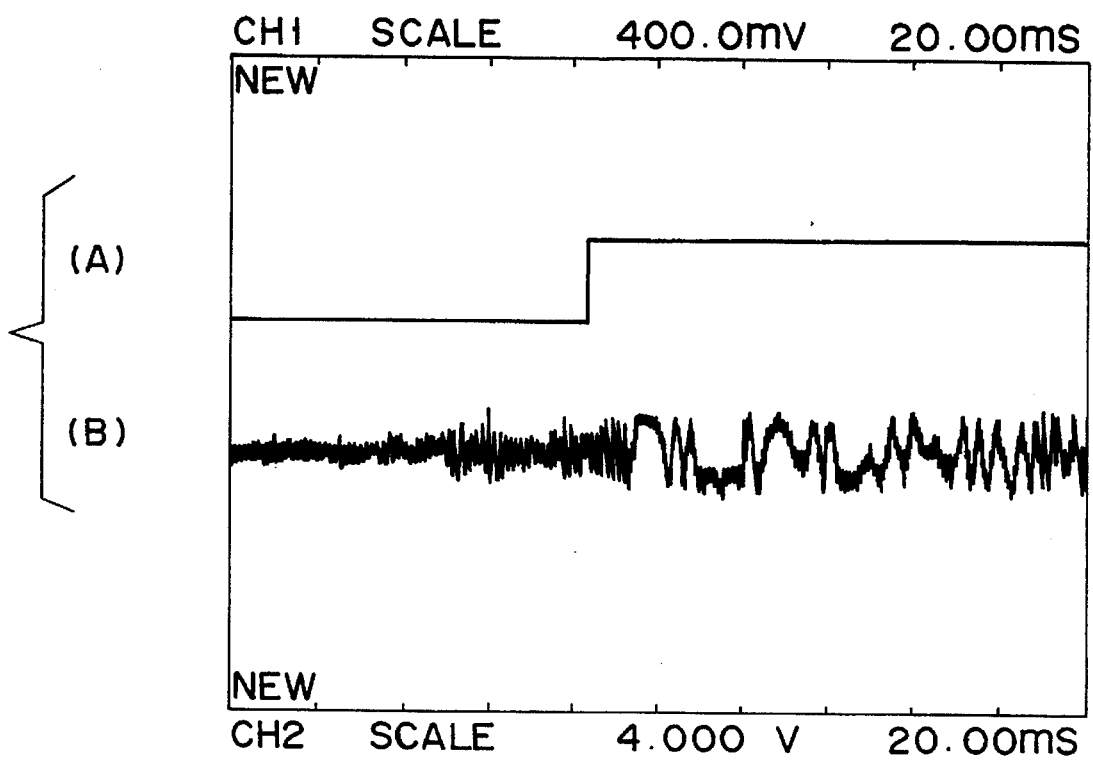
FIGS. 14(A) and 14(B) are concrete waveform diagrams of a control signal and a tracking error signal measured when braking is applied to the vibration of the pickup lens after the movement of the optical pickup is interrupted.

FIGS. 13(A) and 13(B) respectively show a control signal and a speed signal obtained when the switch 43 is set into the ON state to apply vibration to the pickup lens 35a after the control signal is inverted from the "L" level to the "H" level and the movement of the optical pickup 35 is interrupted. In this case, it is understood that vibration of the pickup lens 35a can be immediately attenuated when the control signal is inverted from the "L" level to the "H" level and the movement of the optical pickup 35 is interrupted. FIGS. 14(A) and 14(B) respectively show a control signal and a tracking error signal TE with the time base of the control signal waveform of FIG. 13(A) enlarged, and it is understood that vibration of the pickup lens 35a starts to be attenuated when approx. 20 milliseconds have elapsed after the optical pickup 35 is stopped.

Figure 15:
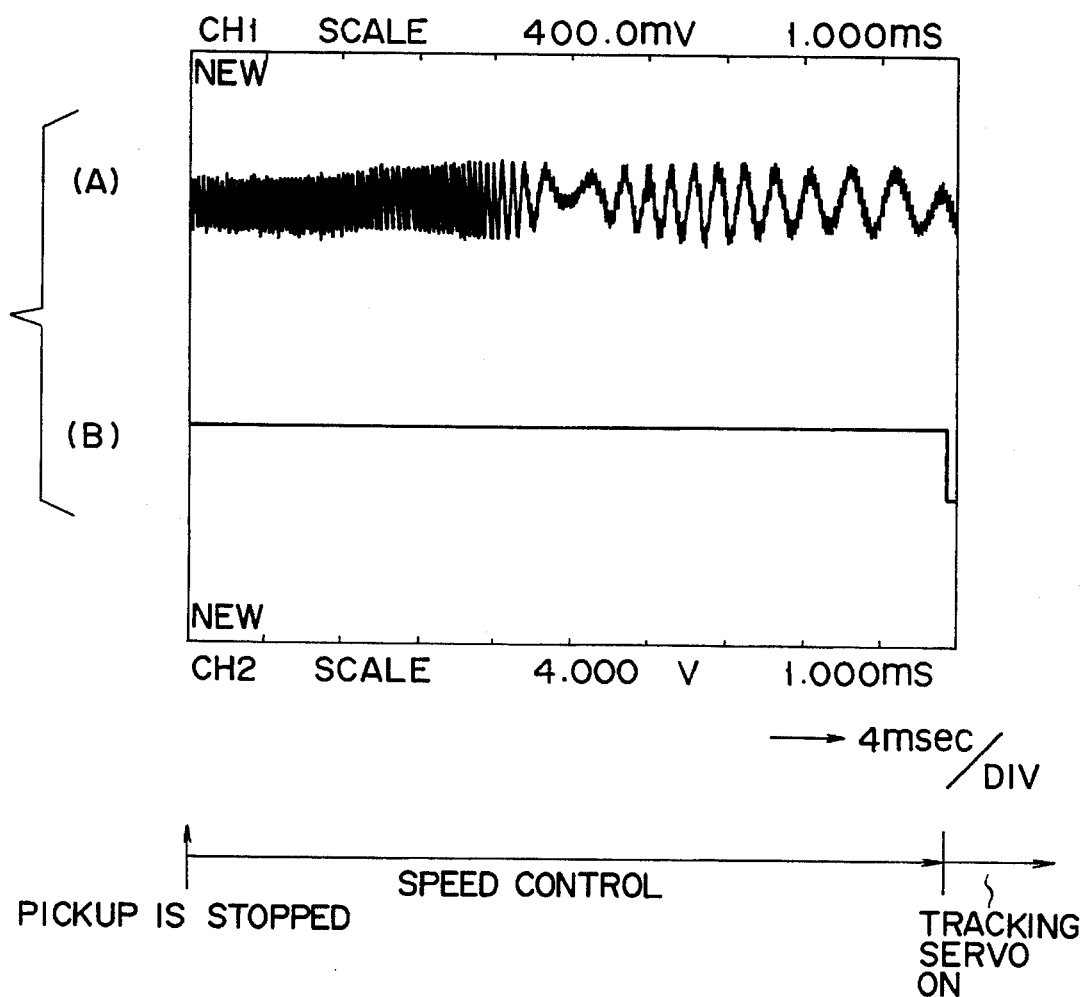
FIGS. 15(A) and 15(B) are concrete waveform diagrams of an RF detection signal and a control signal measured when the tracking servo is set into the ON state after vibration of the pickup lens is suppressed.

FIGS. 15(A) and 15(B) respectively show an RF detection signal and a control signal obtained when the switch 43 is set in the ON state to apply vibration to the pickup lens 35a after the searching operation is completed and the movement of the optical pickup 35 is interrupted and then the switches 43 and 38 are respectively set into the OFF and ON states to set the tracking servo into the ON state, and a speed signal subjected to the full-wave rectification shown in FIG. 4(F) is used as the speed signal for braking. In this case, it is understood that the tracking servo is set into the ON state when the control signal is inverted from the "H" level to the "L" level but it is possible to set up a state in which the tracking servo can be set into the ON state when approx. 20 milliseconds have elapsed after the movement of the optical pickup 35 is interrupted.

Figure 16:
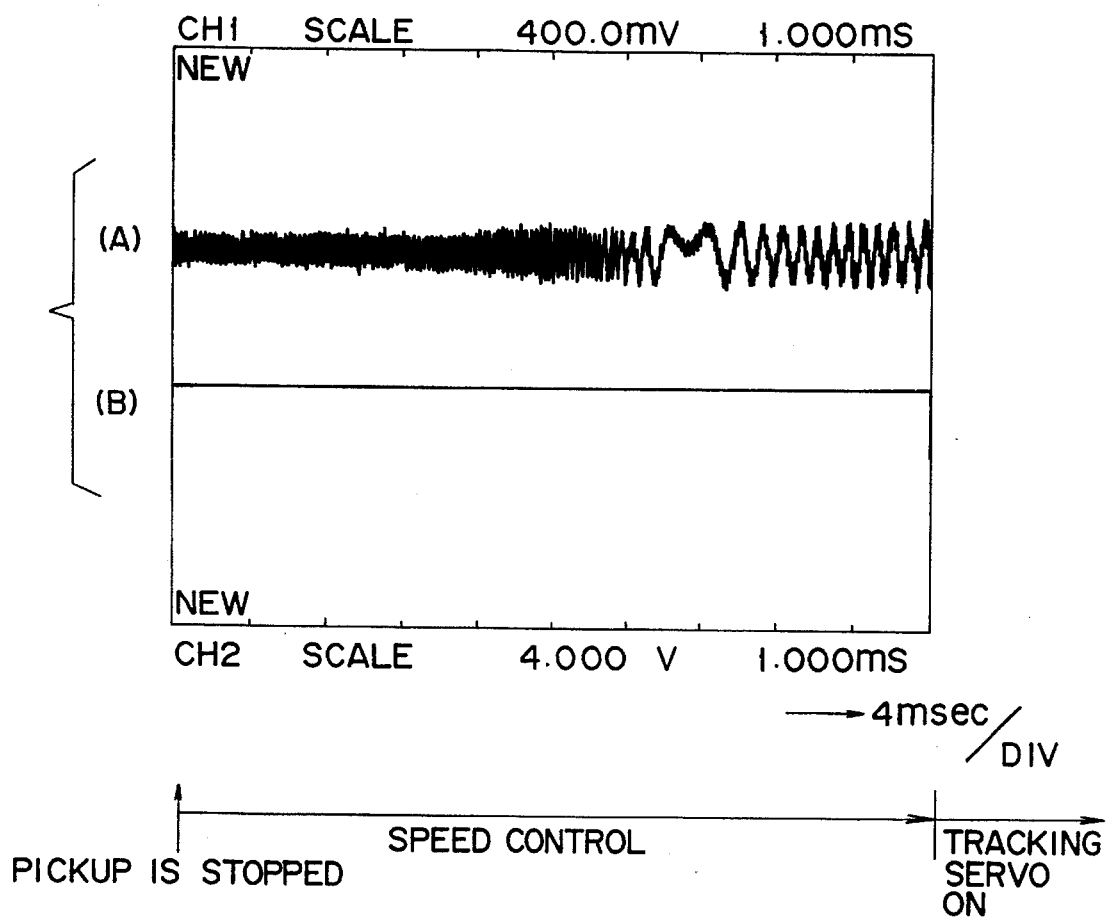
FIGS. 16(A) and 16(B) are other concrete waveform diagrams of an RF detection signal and a control signal measured when the tracking servo is set into the ON state after vibration of the pickup lens is suppressed.

FIGS. 16(A) and 16(B) respectively show an RF detection signal and a control signal obtained when the switch 43 is set in the ON state to apply vibration to the pickup lens 35a after the searching operation is completed and the movement of the optical pickup 35 is interrupted and then the switches 43 and 38 are respectively set into the OFF and ON states to set the tracking servo into the ON state, and a speed signal subjected to the half-wave rectification shown in FIG. 4(G) is used as the speed signal for braking. In this case, it is understood that the tracking servo is set into the ON state when the control signal is inverted from the "H" level to the "L" level but it is possible to set up a state in which the tracking servo can be set into the ON state when approx. 30 milliseconds have elapsed after the movement of the optical pickup 35 is interrupted.

Figure 17:
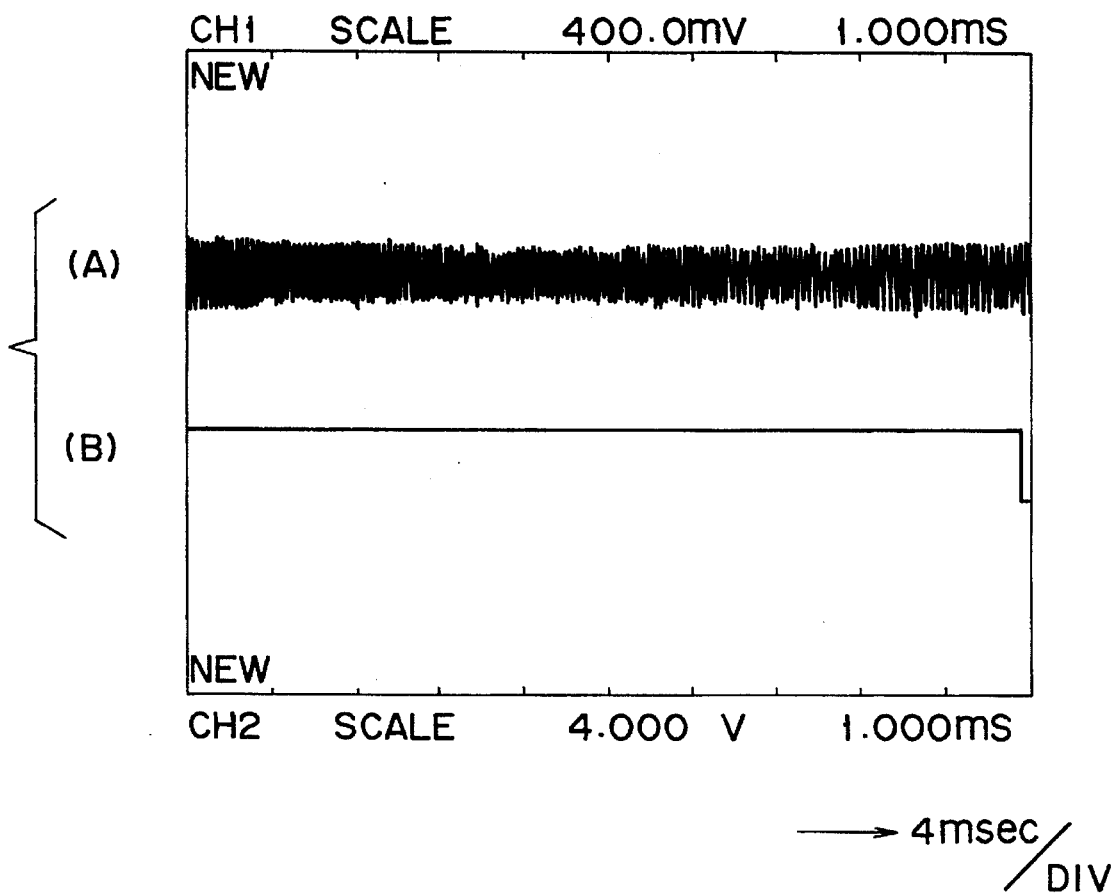
FIGS. 17(A) and 17(B) are concrete waveform diagrams of an RE detection signal and a control signal measured when braking is not applied to the vibration of the pickup lens after the movement of the optical pickup is interrupted.

FIGS. 17(A) and 17(B) respectively show an RF detection signal and a control signal obtained when the switch 43 is kept in the OFF state so as not to apply vibration to the pickup lens 35a even after the searching operation is completed and the movement of the optical pickup 35 is interrupted. In this case, it is understood that vibration of the pickup lens 35a is not attenuated at all after the movement of the optical pickup 35 is interrupted.

After the above speed signal is integrated, it can be used as a position signal indicating the position of the optical pickup 35. FIG. 18 shows a tracking servo means using the above position signal. The speed signal output from the speed detection circuit 42 is supplied to and integrated by an integrating circuit 44 so as to be converted into a position signal and the position signal is supplied to the phase compensation circuit 39 and used for the tracking servo. Further, in a circuit of FIG. 19, a tracking error signal TE output from the tracking error signal creation circuit 37 and a position signal obtained by integrating a speed signal output from the speed detection circuit 42 by use of the integration circuit 44 are added together by means of an adder circuit 45 and the result of addition is supplied to the phase compensation circuit 39. Thus, the tracking error signal TE and the position signal are combined and used for the tracking servo.

Thus, the position signal obtained by integrating the speed signal is used for the tracking servo so that the following advantages can be attained. That is, as shown in FIG. 20, a normal tracking error signal TE can be used for the tracking servo only in the negative feedback region a of each track, and when the light beam is moved from the on-track point to the right side in the drawing, a+tracking error signal TE is generated to control the light beam so as to move the light beam towards the left side and when the light beam is moved from the on-track point to the left side in the drawing, a—tracking error signal TE is generated to control the light beam so as to move the light beam towards the right side. In a case where the light beam is excessively moved towards the right side in the drawing, for example, so as to exceed a range of the negative feedback region a and enter a range of the positive feedback region b by externally applied impact or vibration, the light beam will be further moved towards the right side and is continuously moved until it enters a range of the next negative feedback region a and becomes stable. Thus, a so-called track jump occurs and the number of tracks to be jumped increases according to the magnitude of applied impact or vibration.

However, since the above position signal is derived by integrating the speed signal, it becomes continuous from the on-track point as shown in FIG. 21 and it is possible to operate the tracking servo so as to set the light beam back to the original position even if the light beam is excessively moved by impact or vibration, thereby improving the impact resistance and vibration characteristic.

Figure 22:
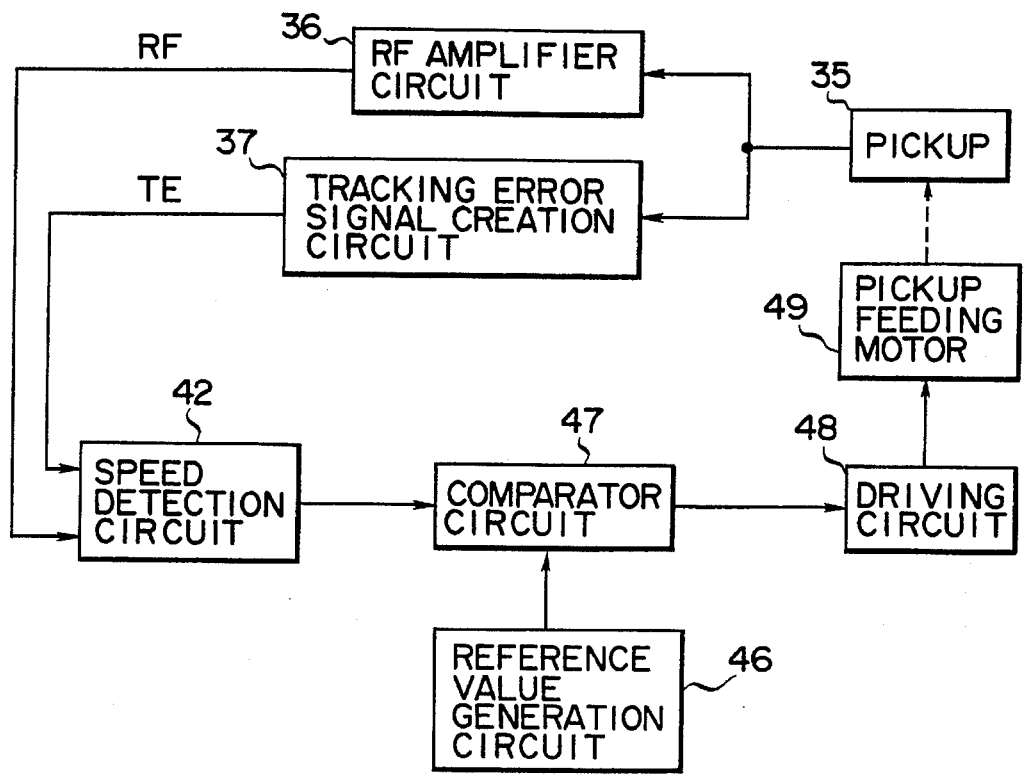
FIG. 22 is a block diagram showing an example of the construction for controlling the traveling speed of the optical pickup by using this invention.

FIG. 22 shows an example of a circuit for controlling the traveling speed of the optical pickup 35 by use of a speed signal. A speed signal output from the speed detection circuit 42 is compared with a reference value signal output from a reference value generator 46 for determining the traveling speed of the optical pickup 35 by a comparator circuit 47 and the comparison output is supplied to a pickup feeding motor 49 via a driving circuit 48 to control the rotation speed of the pickup feeding motor 49 and move the optical pickup 35 at a speed corresponding to the above reference value. With this construction, the traveling speed of the optical pickup can be controlled at a high precision even in a case where the optical pickup 35 is moved at a low speed.

Figure 23:
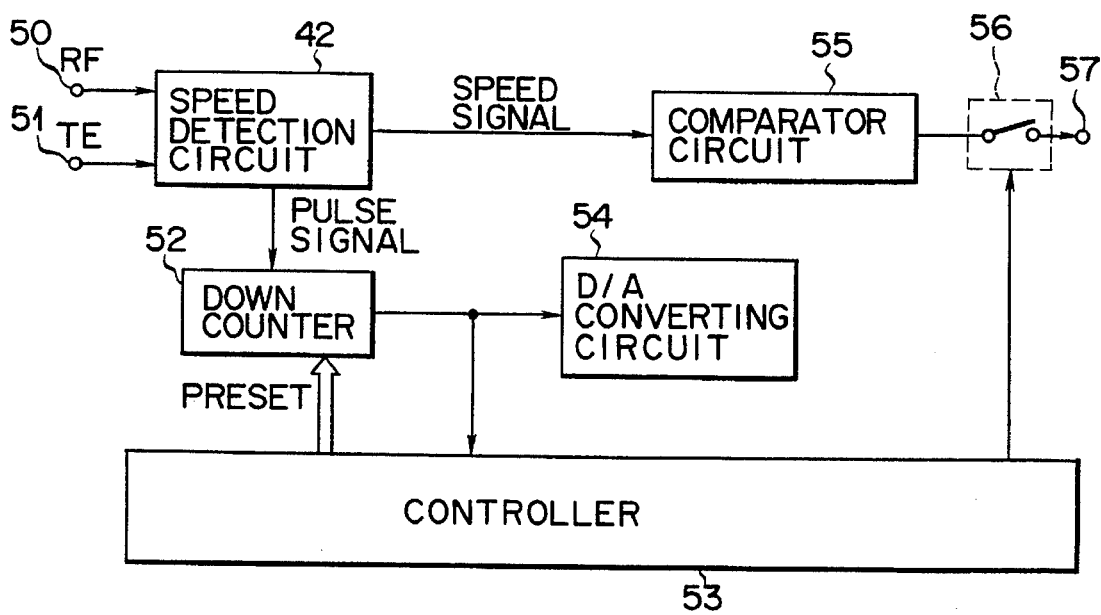
FIG. 23 is a block diagram showing an example of the construction for controlling the track jumping operation of the pickup lens by using this invention.

FIG. 23 shows an example of a circuit for controlling the track jumping operation of the pickup lens 35a by use of a speed signal. An RF signal and a tracking error signal TE respectively supplied to input terminals 50 and 51 are supplied to the speed detection circuit 42 and used for creation of a speed signal. At this time, a pulse signal (which is shown in FIG. 4(D), for example) corresponding to the number of tracks crossed by the pickup lens 35a and obtained in the process of creating the speed signal by the speed detection circuit 42 is supplied to a down-counter 52. The down-counter 52 is supplied with preset data corresponding to the track jumping amount of the pickup lens 35a from a controller 53 and the down-counter 52 effects the down-counting operation starting from the preset value each time the pulse is supplied.

The count value output from the down-counter 52 is supplied to the controller 53 and at the same time converted into an analog signal by a D/A (digital/analog) converter circuit 54 whose output is compared with the speed signal by a comparator circuit 55. An error signal from the comparator circuit 55 is supplied to a tracking actuator coil (not shown) via a switch 56 which is set in the ON state by the control of the controller 53 and an output terminal 57 and is used for moving the pickup lens 35a.

when the track jumping operation by the pickup lens 35a is effected, the controller 53 supplies preset data corresponding to a track jumping amount of the pickup lens 35a to the down-counter 52 and sets the same into the counter 52. Thus, the down-counter 52 comes to have the preset value and the preset value is converted into an analog signal by the D/A converter circuit 54 and then supplied to the comparator circuit 55. An error signal output from the comparator circuit and corresponding to a difference between the analog signal and the speed signal is supplied to the tracking actuator coil and used for moving the pickup lens 35a. In this case, at the starting time of the track jumping operation, substantially no speed signal is generated so that the pickup lens 35a can be moved in a preset direction with full acceleration.

Thus, when the pickup lens 35a is moved and crosses a tack, a pulse signal and a speed signal are generated from the speed detection circuit 42. In this way, the content of the down-counter 52 is gradually reduced, an analog signal corresponding to the output thereof is compared with the speed signal and the pickup lens 35a is continuously moved according to the error signal corresponding to the comparison result. Then, when the number of pulses of the pulse signal becomes equal to the preset value of the down-counter 52, that is, when the content of the down-counter 52 becomes "0", the controller 53 sets the switch 56 into the OFF state to interrupt supply of the error signal to the tracking actuator coil. Thus, the track jumping operation by the pickup lens 35a is completed.

Figure 24A:
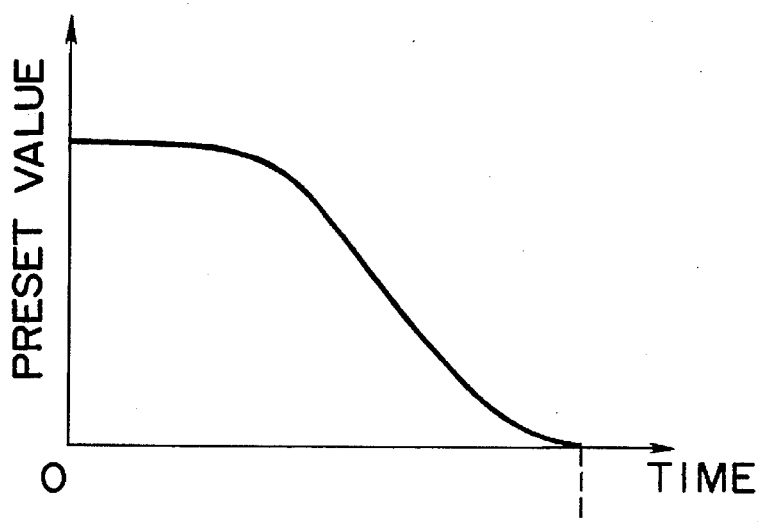
FIGS. 24(A) and 24(B) are waveform diagrams at various points for explaining the track jumping operation.
Figure 24B:
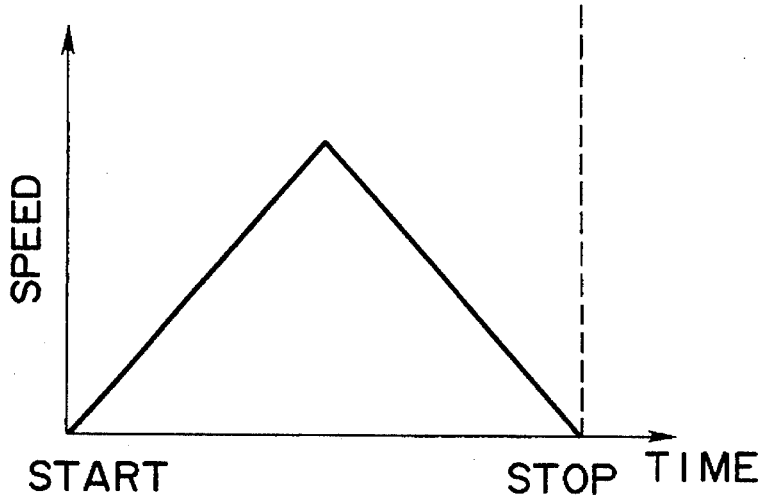

FIGS. 24(A) and 24(B) respectively show variation in the preset value according to the down-counting operation by the down-counter 52 and variation in the traveling speed of the pickup lens 35a in the track jumping operation.

FIG. 25 shows an example of a circuit for controlling the track jumping operation by the optical pickup 35 using the speed signal. In this case, the basic construction is similar to that shown in FIG. 23 except that an error signal output from the comparator circuit 55 is supplied to the driving circuit 48 via the switch 56 controlled by the controller 53 so as to control the rotation speed of the pickup feeding motor 49.

What is claimed is:

1. A disk reproducing device comprising:

a disk being an information signal recorded on a continuous track thereon;

a pickup element, which is supported movably in a radial direction of said disk, for reading out and outputting the information signal recorded on said disk by tracing the track of said disk;

tracking error signal generating means for generating a tracking error signal corresponding to a distance of said pickup element, which is moved from the track of said disk in the radial direction, on the basis of a signal output from said pickup element;

speed detecting means for generating a speed signal proportional to the relative movement speed of said pickup element with respect to said disk in a case where said pickup element is moved in the radial direction of said disk, on the basis of the tracking error signal generated from said tracking error signal generating means and the signal output from said pickup element, said speed detecting means including:

differentiating means for differentiating the tracking error signal generated by said tracking error signal generating means to output a differential signal, detector means for detecting the signal output from said pickup element and for outputting an envelope detecting signal corresponding to an envelope of the signal, comparing means for generating a signal representing an intermediate level between a peak level and a bottom level of the envelope detection signal output from said detector means, comparing the intermediate level signal with a current level of the envelope detection signal, and on the basis of the level comparison, generating a pulse signal representative of the envelope detection signal sliced at the intermediate level, and rectifier means for rectifying the differential signal output from said differentiating means on the basis of the pulse signal generated by said comparing means, and for outputting the rectified differential signal as the speed signal;

integrating means for integrating the speed signal generated by said speed detecting means and for generating a position signal with a linear characteristic for showing a position of said pickup element; and control means for controlling said pickup element in the radial direction of said disk such that said pickup element is located on a desired position, on the basis of the position signal generated by said integrating means.

2. The disk reproducing device according to claim 1, wherein said rectifier means includes a switching element, which is turned on and off, on the basis of the pulse signal generated by said comparing means to subject the differential signal output from said differentiating means to full-wave rectification.

3. The disk reproducing device according to claim 1, wherein said rectifier means includes a switching element, which is turned on and off, on the basis of the pulse signal generated by said comparing means to subject the differential signal output from said differentiating means to half-wave rectification.

4. A disk reproducing device comprising:

a disk being an information signal recorded on a continuous track thereon;

a pickup element, which is supported movably in a radial direction of said disk, for reading out and outputting the information signal recorded on said disk by tracing the track of said disk;

tracking error signal generating means for generating a tracking error signal corresponding to a distance of said pickup element, which is moved from the track of said disk in the radial direction, on the basis of a signal output from said pickup element;

speed detecting means for generating a speed signal proportional to the relative movement speed of said pickup element with respect to said disk in a case where said pickup element is moved in the radial direction of said disk, on the basis of the tracking error signal generated from said tracking error signal generating means and the signal output from said pickup element, said speed detecting means including:

differentiating means for differentiating the tracking error signal generated by said tracking error signal generating means to output a differential signal, detector means for detecting the signal output from said pickup element and for outputting an envelope detecting signal corresponding to an envelope of the signal, comparing means for generating a signal representing an intermediate level between a peak level and a bottom level of the envelope detection signal output from said detector means, comparing the intermediate level signal with a current level of the envelope detection signal, and on the basis of the level comparison, generating a pulse signal representative of the envelope detection signal sliced at the intermediate level, and rectifier means for rectifying the differential signal output from said differentiating means on the basis of the pulse signal generated by said comparing means, and for outputting the rectified differential signal as the speed signal;

integrating means for integrating the speed signal generated by said speed detecting means and for generating a position signal with a linear characteristic for showing a position of said pickup element;

adding means for outputting an added signal obtained by adding the position signal generated by said integrating means and the tracking error signal generated by said tracking error signal generating means; and control means for controlling said pickup element in the radial direction of said disk such that said pickup element is located on a desired position, on the basis of the added signal generated by said adding means.

5. The disk reproducing device according to claim 4, wherein said rectifier means includes a switching element, which is turned on and off, on the basis of the pulse signal generated by said comparing means to subject the differential signal output from said differentiating means to full-wave rectification.

6. The disk reproducing device according to claim 4, wherein said rectifier means includes a switching element, which is turned on and off, on the basis of the pulse signal generated by said comparing means to subject the differential signal output from said differentiating means to half-wave rectification.

* * * * *